(12) United States Patent
Nagai

(10) Patent No.: US 7,995,532 B2
(45) Date of Patent: Aug. 9, 2011

(54) METHOD FOR REDUCING DETERIORATION IN RECEIVING PERFORMANCE AND A RADIO APPARATUS USING THE METHOD

(75) Inventor: Makoto Nagai, Kakamigahara (JP)

(73) Assignee: Sanyo Electric Co., Ltd., Osaka (JP)

( * ) Notice: Subject to any disclaimer, the term of this patent is extended or adjusted under 35 U.S.C. 154(b) by 991 days.

(21) Appl. No.: 11/846,128

(22) Filed: Aug. 28, 2007

(65) Prior Publication Data

US 2008/0056205 A1 Mar. 6, 2008

(30) Foreign Application Priority Data

Aug. 29, 2006 (JP) ................................. 2006-232848

(51) Int. Cl.
*H04W 4/00* (2009.01)

(52) U.S. Cl. ........ 370/330; 370/436; 370/437; 370/442; 370/458

(58) Field of Classification Search .................. 370/330, 370/436, 437, 442, 458
See application file for complete search history.

(56) References Cited

U.S. PATENT DOCUMENTS

| | | | | |
|---|---|---|---|---|
| 6,493,331 | B1 * | 12/2002 | Walton et al. | 370/341 |
| 7,016,319 | B2 * | 3/2006 | Baum et al. | 370/329 |
| 7,072,413 | B2 * | 7/2006 | Walton et al. | 375/267 |
| 7,149,476 | B2 * | 12/2006 | Shah | 455/67.11 |
| 7,151,755 | B2 * | 12/2006 | Xu | 370/330 |
| 7,423,991 | B2 * | 9/2008 | Cho et al. | 370/329 |
| 7,522,924 | B2 * | 4/2009 | Abeta et al. | 455/452.2 |
| 2005/0286547 | A1 * | 12/2005 | Baum et al. | 370/437 |
| 2007/0258394 | A1 * | 11/2007 | Hamaguchi | 370/310 |
| 2007/0291702 | A1 * | 12/2007 | Nanba et al. | 370/336 |

FOREIGN PATENT DOCUMENTS

| | | |
|---|---|---|
| JP | 2005-502218 | 1/2005 |
| WO | WO 2006/011471 A1 | 2/2006 |
| WO | WO/2006/043588 * | 4/2006 |

OTHER PUBLICATIONS

Takashi Baba, et al., A Study on Group-Controlled Frequency Domain Scheduling for OFDMA/TDD Systems, Technical Report of IEICE, Mar. 2006, pp. 1-6, The Institute of Electronics Information and Communication Engineers.

Chinese Office Action, w/ English translation thereof, issued in Chinese Patent Application No. CN 200710148173.8 dated Dec. 27, 2010.

Japanese Office Action, with English translation, issued in Japanese Patent Application No. 2006-232848, mailed May 17, 2011.

* cited by examiner

*Primary Examiner* — Daniel J Ryman
*Assistant Examiner* — Jay P Patel
(74) *Attorney, Agent, or Firm* — McDermott Will & Emery LLP

(57) ABSTRACT

To allocate a terminal apparatus to a time slot to which a plurality of subcarriers are assigned, a base station apparatus first acquires the strength of signals between the base station apparatus and the terminal apparatus. Then the base station apparatus specifies a group, containing the acquired strength, among a plurality of groups. The plurality of groups are predefined in a manner such that the ranges of values of the acquired strengths differs respectively. Time slots to be allocated are predefined respectively for the plurality of groups. A time slot corresponding to the specified group is selected, and a subcarrier to be assigned to the terminal apparatus is selected from among a plurality of subcarriers contained in the selected time slot.

6 Claims, 13 Drawing Sheets

FIG.5

| GROUP | RANGE OF SIGNAL STRENGTH P | SLOT NO. |
|---|---|---|
| A | $P_A \leq P < P_B$ | 1 |
| B | $P_B \leq P < P_C$ | 2 |
| C | $P_C \leq P < P_D$ | 3 |
| D | $P_D \leq P$ | 4 |

310    320    330

300

METHOD FOR REDUCING DETERIORATION IN RECEIVING PERFORMANCE AND A RADIO APPARATUS USING THE METHOD

CROSS-REFERENCE TO RELATED APPLICATIONS

This application is based upon and claims the benefit of priority from the prior Japanese Patent Application No. 2006-232848, filed Aug. 29, 2006, the entire contents of which are incorporated herein by references.

BACKGROUND OF THE INVENTION

1. Field of the Invention

The present invention relates to a wireless communication technology, and it particularly relates to a method for performing wireless communications with a terminal apparatus and a radio apparatus using the method.

2. Description of the Related Art

In wireless communications, it is generally desired that the limited frequency resources be used effectively. With the wide use of mobile phones and second-generation cordless telephone systems, such a demand is ever increasing. One of technologies that meet this request is a technique called OFDMA (Orthogonal Frequency Division Multiple Access). OFDMA is a technique where communications between a base station apparatus and a plurality of terminal apparatuses are performed at the same timing by allocating signals transmitted from the terminal apparatuses to mutually orthogonal frequency bands. In general, the OFDMA technique requires scheduling processing for allocating a plurality of terminal apparatuses to the respective frequency bands. In the conventional practice, a frequency band whose signal-to-noise ratio is high in a plurality of frequency bands is allocated to the terminal apparatuses. Also, terminal apparatuses whose received powers are close to one another are put together into a plurality of groups, and a frequency band is allocated to each of the plurality of groups.

In the OFDMA, demodulation processings such as FFT (Fast Fourier Transform) processing and AGC (Automatic Gain Control) processing are generally performed, at one time and all together, on signals composed of a plurality of subcarriers allocated to the same slot, at a receiving side. However, in a case where the same slot is allocated to different terminal apparatuses but a received power of one terminal apparatus is extremely lower than that of another terminal apparatus, the amplitude is adjusted based on a higher received power as a reference at the time of the demodulation processing such as the AGC processing. Thus a problem arises where the receiving performance deteriorates because the signal at the terminal of a lower received power cannot achieve a sufficient gain.

SUMMARY OF THE INVENTION

The present invention has been made in view of such circumstances and a general purpose thereof is to provide a communication method to reduce the deterioration in receiving performance and a radio apparatus using the method.

In order to resolve the above problems, a receiving apparatus according to one embodiment of the present invention allocates a terminal apparatus to a time slot to which a plurality of subcarriers are assigned. This radio apparatus comprises: an acquiring unit which acquires a strength of signals between the radio apparatus and the terminal apparatus; a group specifying unit which specifies a group, containing the strength acquired by the acquiring unit, among a plurality of groups wherein the plurality of groups are predefined in a manner such that ranges of strength values for the plurality of groups differ respectively from the strength acquired by the acquiring unit; a slot selector which selects a time slot corresponding to the group specified by the group specifying unit wherein time slots to be allocated are predefined respectively for the plurality of groups predefined by the group specifying unit; a subcarrier selector which selects a subcarrier to be assigned to the terminal apparatus, from among a plurality of subcarriers contained in the time slot selected by the slot selector; and a communication executing unit which performs communications between the radio apparatus and the terminal apparatus by using the time slot selected by the slot selector and the subcarrier selected by the subcarrier selector.

It is to be noted that any arbitrary combination of the aforementioned constituting elements, and the implementation of the present invention in the form of a method, an apparatus, a system, a recording medium, a computer program and so forth may also be effective as and encompassed by the embodiments of the present invention.

BRIEF DESCRIPTION OF THE DRAWINGS

Embodiments will now be described by way of examples only, with reference to the accompanying drawings which are meant to be exemplary, not limiting and wherein like elements are numbered alike in several Figures in which:

FIG. 5 shows an exemplary structure of an allocation table stored in a memory of FIG. 4;

DETAILED DESCRIPTION OF THE INVENTION

The invention will now be described by reference to the preferred embodiments. This does not intend to limit the scope of the present invention, but to exemplify the invention.

An outline of the present invention will be given before a specific description thereof. This communication system is preferably used for a next-generation cordless telephone system. A system realizing a fast communication is desired for the next-generation cordless telephone system. For this purpose, an FDMA (Frequency Division Multiple Access) scheme, a TDMA (Time Division Multiple Access) scheme and the like are combined and used. The FDMA scheme is a method where different frequency bands are allocated to a plurality of terminal apparatuses, respectively, and used thereby. The TDMA scheme is a method where each time slot is assigned to each different terminal apparatus and used thereby. A description is given hereunder of a case where an OFDMA scheme is used as the FDMA scheme. The OFDMA scheme is a method where among a plurality of terminal apparatuses 20 their respective frequency signals are orthogonalized with one another, so that as many terminal apparatuses as possible can be accommodated. The combining of the OFDMA scheme and the TDMA scheme makes it possible to allocate a single time slot to a plurality of terminal apparatuses. This can allow the allocation of a time slot to as many terminal apparatuses as possible. Also, an uplink transmission and a downlink transmission are separated by a TDD (Time Division Duplex) scheme. The TDD scheme is a method where the same frequency band is used simultaneously, and different time slots are used between an uplink and a downlink. For convenience of explanation, a description is given hereinbelow of the uplink transmission only. Since the uplink transmission and the downlink transmission are symmetrical with each other, the description of the downlink transmission is omitted in the present embodiments.

In the present embodiment, a time slot to be allocated is selected according to the strength of signal from a terminal apparatus. In a time slot to be selected, the range of the signal strength required by a terminal apparatus to be allocated is defined beforehand. Accordingly, a plurality of terminal apparatuses to which a single time slot is allocated have signal strengths in a predefined range, respectively. As a result, the difference in signal strength gets smaller in the same slot. Also, at the time of decoding, any of the terminal apparatuses is not affected by other terminal apparatuses, so that the deterioration in the receiving performance can be reduced. The detail will be discussed later.

Figure 1:
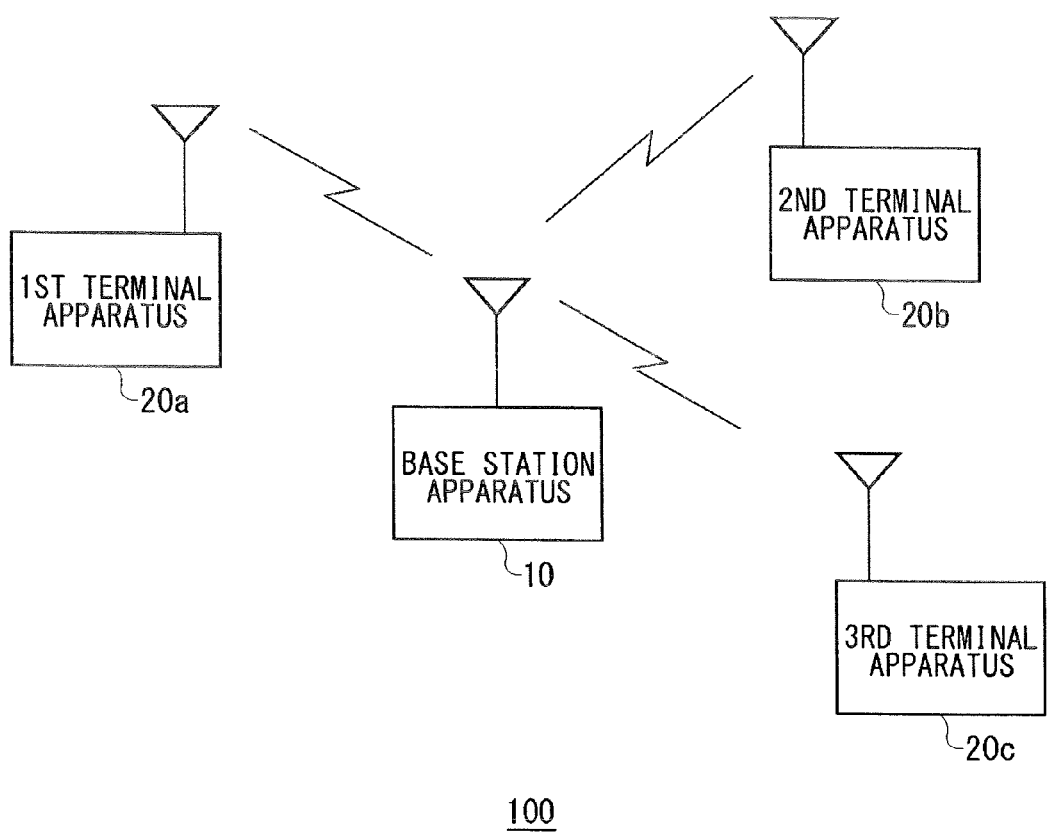
FIG. 1 shows an exemplary structure of a communication system according to an embodiment of the present invention.

FIG. 1 shows an exemplary structure of a communication system 100 according to an embodiment of the present invention. The communication system 100 includes a base station apparatus 10, and a first terminal apparatus 20a, a second terminal apparatus 20b and a third terminal apparatus 20c, which are represented by a terminal apparatus 20. Although three terminal apparatuses 20 are shown in FIG. 1 for convenience of explanation, there may be two or less or four or more terminal apparatuses 20.

Figure 2:
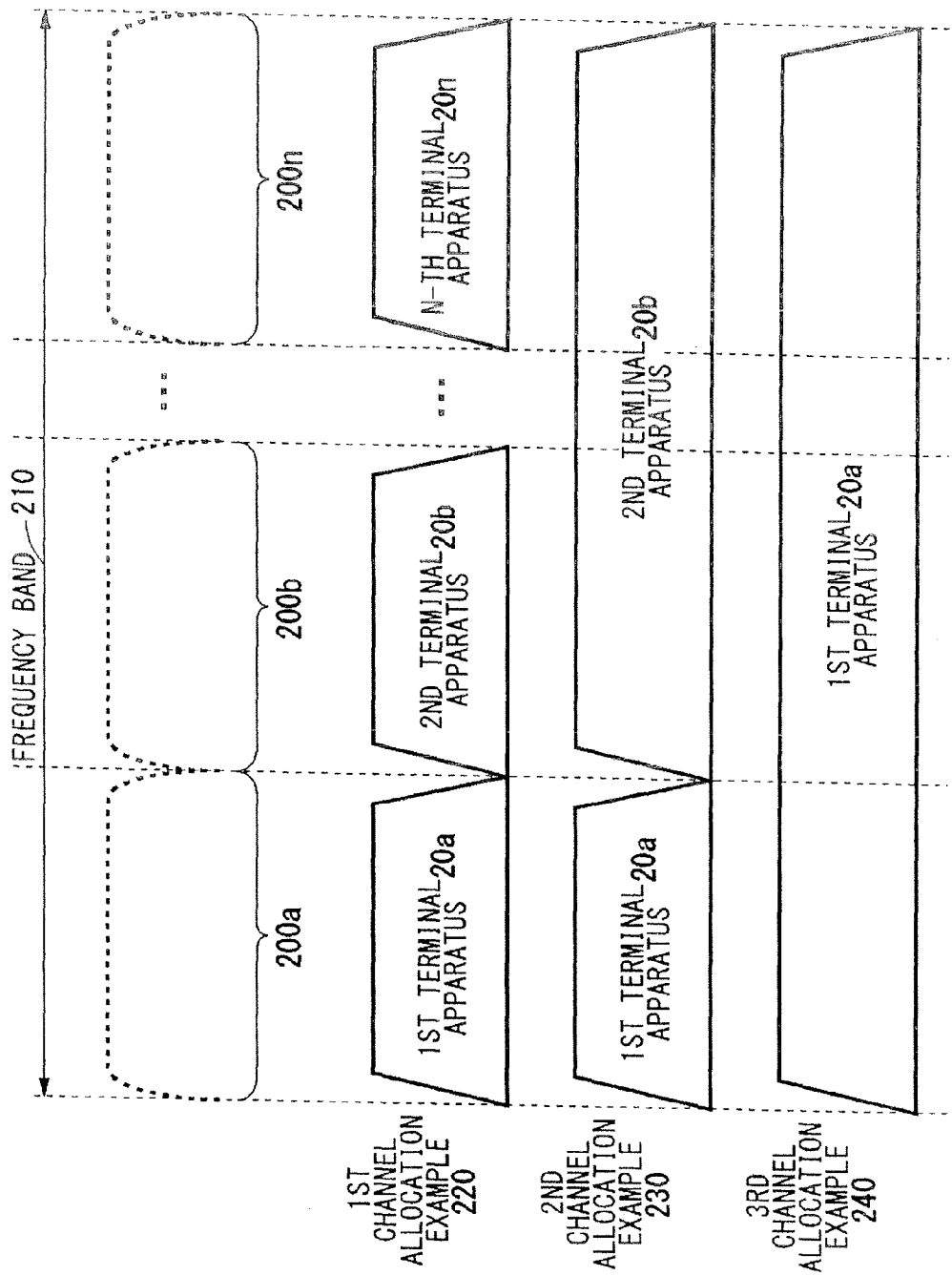
FIG. 2 shows an example of allocation of subcarrier blocks in a communication system shown in FIG. 1.
Figure 3:
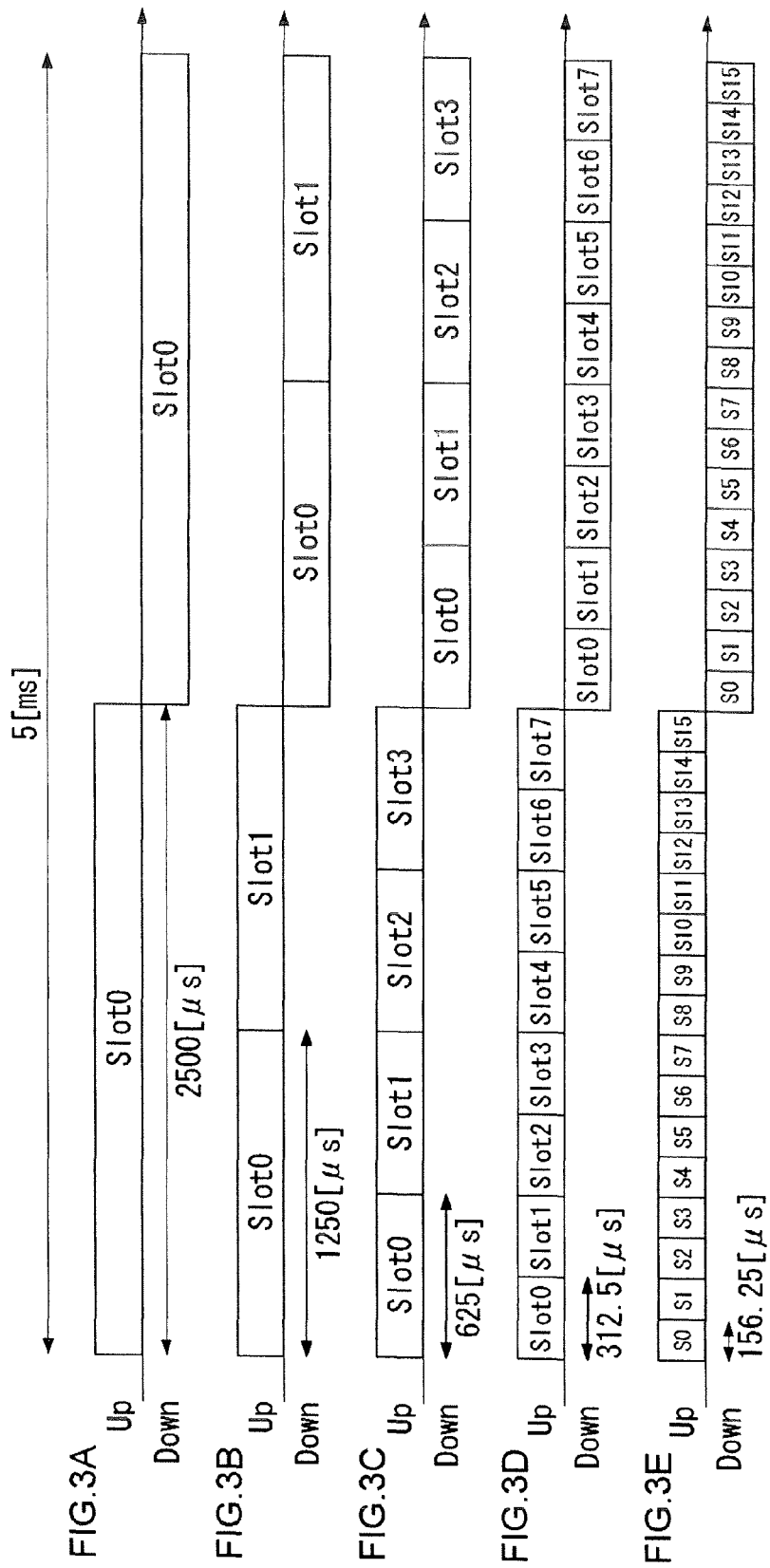
FIGS. 3A to 3E show examples of allocation of time slots in a communication system of FIG. 1.

FIG. 2 shows an example of allocation of subcarrier blocks 200 in the communication system 100 shown in FIG. 1. A frequency band 210, having the bandwidth of 10 MHz, which includes a plurality of subcarrier blocks 200, is used for the communication system 100. The frequency band 210 includes N subcarrier blocks which are a first subcarrier block 200a to an nth subcarrier block 200n. Here, the first subcarrier block 200a to the nth subcarrier block 200n are represented by "subcarrier block 200". Each of subcarrier blocks 200 includes M subcarriers. Therefore the frequency band 210 contains N×M subcarriers. Hereinafter, for convenience of explanation, a description will be given assuming that N and M are each an integer of two or greater. Although, for convenience of explanation, the number of subcarriers contained in each of subcarrier blocks 200 is set to M, the subcarrier blocks 200 may each contain a different number of subcarriers.

For each subcarrier block 200, the base station apparatus 10 allocates different subcarrier blocks 200 to a plurality of terminal apparatuses 20 performing communications, respectively. The terminal apparatus 20 performs communications with the base station apparatus 10 using the allocated subcarrier block 200. The base station apparatus 10 performs FFT processing and then separates the signals composed of a plurality of subcarrier blocks 200 transmitted from a plurality of terminal apparatus 20, into N×M subcarriers. Since each subcarrier is associated with any of subcarrier blocks 200, the signal from each terminal apparatus 20 can be identified.

A first channel allocation example 220 shows a case where each terminal apparatus 20 is allocated for each of the subcarrier blocks 200. That is, the maximum of N terminal apparatuses 20 can be allocated in the communication system 100. A second channel allocation example 230 shows a case where the subcarrier blocks 200 are allocated to two terminal apparatuses 20, respectively, and a different number of subcarrier blocks 200 are allocated to each terminal apparatus 20. The second channel allocation example 230 is applied to a case, for example, where both the first terminal apparatus 20a requesting a low speed communication, wherein not so much band is required, and the second terminal apparatus 20b requesting a high speed communication, wherein a large band is required, perform communications simultaneously. By employing such an allocation scheme as above, communications can be flexibly accommodated according to the mode of a service required by the terminal apparatuses 20 and therefore the resources of a system can be optimally allocated. A third channel allocation example 240 shows a case where the entire band is allocated to a single terminal apparatus 20. In such a case where there exists a terminal apparatus 20 requesting a higher speed communication and, at the time of said communication, no request of channel allocation is made from other base station apparatuses 10, the high speed communication can be achieved by employing the allocation scheme as in the third channel allocation example 240.

As described above, the number of subcarrier blocks 200 allocated for each terminal apparatus 20, thus making it possible to provide the allocation according to a radio wave environment or required service quality between the terminal apparatus 20 and the base apparatus 10. As a result, the high speed communication is made possible and at the same time the communication system 100 capable of optimizing the utilization of system resources can be realized. For convenience of explanation, a description is given hereunder based on the allocation example shown in the first channel allocation example 220.

FIGS. 3A to 3E show examples of allocation of time slots in the communication system 100 shown in FIG. 1. The horizontal axis indicates time, whereas the vertical axis indicates either an uplink transmission or a downlink transmission in a separate manner. In FIGS. 3A to 3E, the length of one TDMA frame is 5 ms. In each of FIGS. 3A to 3E, the number of slots for use in uplink transmission differs from that for use in downlink transmission. For example, one slot is allocated for use in uplink transmission in FIG. 3A, whereas two slots are allocated for use in uplink transmission in FIG. 3B. Similarly, four, eight and sixteen slots are allocated for use in uplink transmission in FIGS. 3C to 3E, respectively. In order to have a structure symmetric with respect to the structure of the uplink transmission, the number of slots allocated for use in downlink transmission is the same as with the uplink transmission. For convenience of explanation, a description will be given hereinbelow based on the allocation example shown in FIG. 3C.

Refer back to FIG. 1. When starting a communication, the terminal apparatus 20 requests the base station apparatus 10 to allocate channels. When the channel allocation request is granted, the terminal apparatus 20 acquires information on the allocation, from the base station apparatus 10. The information on the allocation contains identification information that indicates time slots and subcarrier blocks 200 to be allocated. After having acquired the information on the allocation, the terminal apparatus 20 performs communications with the base station apparatus 10. If, on the other hand, the channel allocation is not granted, the terminal apparatus 20 acquires information on the ungranted allocation, from the base station apparatus 10.

Figure 4:
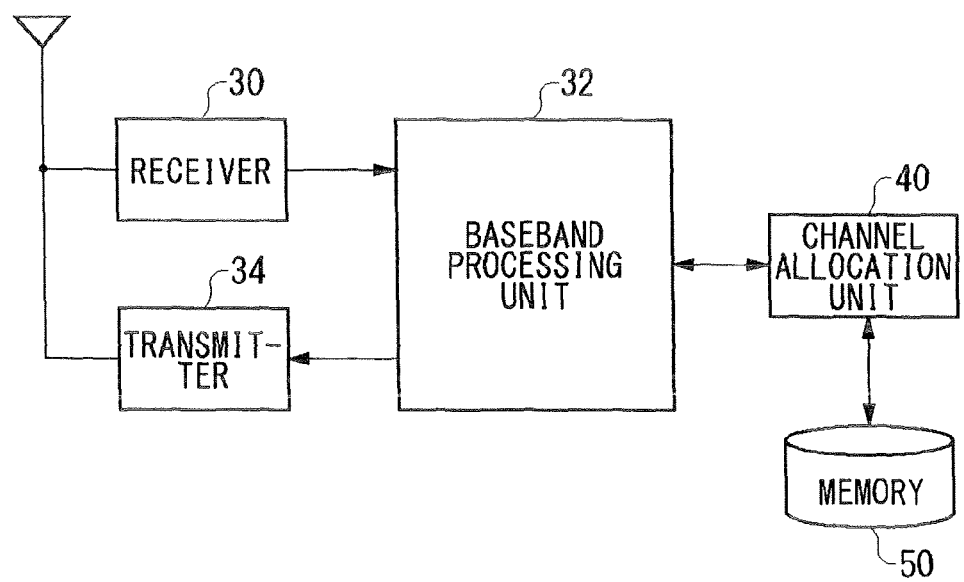
FIG. 4 shows an exemplary structure of a base station apparatus of FIG. 1.

FIG. 4 illustrates an exemplary structure of the base station apparatus 10 shown in FIG. 1. The base station apparatus 10 includes a receiver 30, a baseband processing unit 32, a transmitter 34, a channel allocation unit 40 and a memory 50. The receiver 30 receives a control channel that indicates an allocation request, from the terminal apparatuses 20. After time slots and subcarrier blocks 200 have been allocated to the terminal apparatus 20, the receiver 30 receives a signal concerning data communications from the terminal apparatus 20. The receiver 30 performs FFT processing on the received signals and thereby separates a predetermined subcarrier block 200 from a plurality of subcarrier blocks 200 so as to send the thus separated subcarrier block 200 to the baseband processing unit 32.

The baseband processing unit 32 performs a predetermined demodulation processing on a signal to which FFT processing or the like has been subjected by the receiver 30, and also performs error correction decoding processing on the signal. The baseband processing unit 32 generates a signal that contains identification information indicative of permission/rejection of allocation, time slots or a subcarrier block 200 to be allocated, and performs an error correction coding processing or a predetermined modulation processing on the signal so as to have the transmitter 34 send the signal. The transmitter 34 performs IFFT (inverse FFT) processing or the like on the signal which has been subjected to the coding processing by the baseband processing unit 32, and then transmits the signal to the terminal apparatus 20.

The memory 50 stores relations between groups and time slots, and stores a required range of the signal strength for each group. FIG. 5 shows an exemplary structure of an allocation table 300 stored in the memory 50 of FIG. 4. The allocation table 300 contains a group column 310, a power range column 320 and a slot column 330. In the power range column 320, $P_A$, $P_B$, $P_C$ and $P_D$ are parameters corresponding respectively to the groups indicated in the group column 310 and are also parameters indicating either an upper limit or a lower limit of the range of signal strength P. A relation in magnitude is $P_A<P_B<P_C<P_D$. $P_A$ may be a minimum value of the strength of a signal to which the subcarrier block 200 can be allocated. In this case, the subcarrier block 200 will not be allocated to a terminal apparatus 20 having the signal strength less than $P_A$. This is because the terminal apparatus 20 having a signal strength less than the signal strength $P_A$ cannot perform communications normally even if the subcarrier block 200 is allocated to this terminal apparatus 20. Thereby, the resources can be effectively utilized.

The channel allocation unit 40 acquires the signal strength of a control channel for each terminal apparatus 20. The signal strength is acquired by measuring the received power of the control channel or the like. Then the channel allocation unit 40 determines if the acquired received power lies in any of the ranges stored in the memory 50. Then it specifies which group, among a plurality of groups contained in the group column 31 in the memory 50, the determined range belongs to. The channel allocation unit 40 selects a slot column 330 corresponding to the specified group, among the slot columns 330 stored in the memory 50, as a time slot to be allocated. Here, if a subcarrier block 200 in the selected time slot is not used and the subcarrier block 200 is usable, the selected time slot will be allocated to the terminal apparatus 20 and information on the allocation will be transmitted to the terminal apparatus 20. Note that the case where the subcarrier block 200 is usable represents a case where the receiving quality is satisfactory and the like.

If, on the other hand, there is no subcarrier blocks 200 left unused in the time slot, that is, if all of a plurality of subcarrier blocks 200 contained in the selected time slot have already been allocated to other terminal apparatuses 20, the channel allocation unit 40 will attempt again the allocation processing by searching other allocatable time slots or reducing the transmission power to the terminal apparatus 20. If, as a result of the above attempt, it is also found that there is no subcarrier blocks 200 to be allocated, the channel allocation unit 40 will transmit information indicating the rejection of the allocation to the terminal apparatus 20.

Figure 6A:
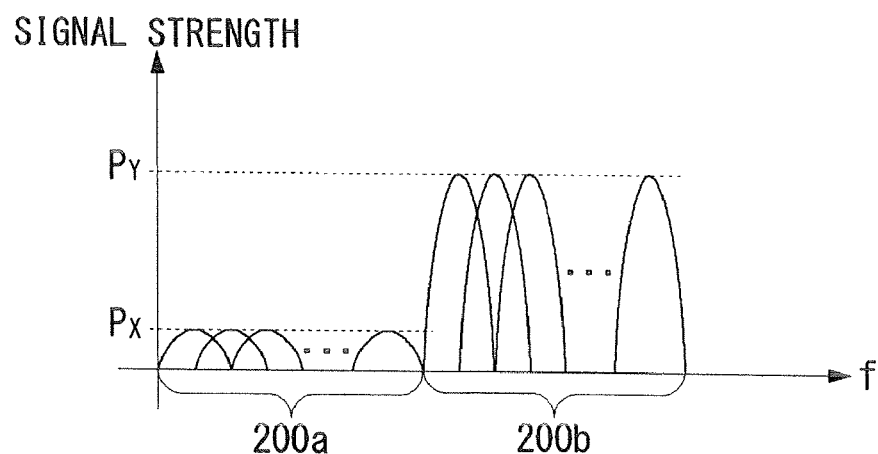
FIGS. 6A and 6B show a first and a second allocation example by a channel allocation unit shown in FIG. 4.
Figure 6B:
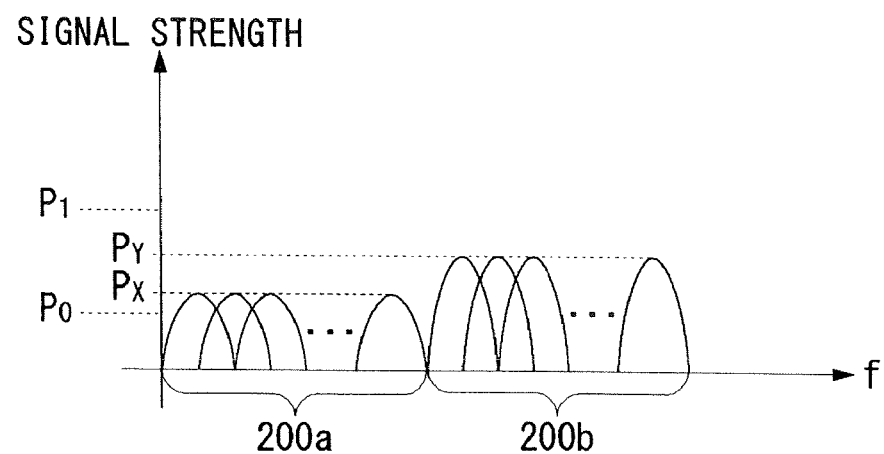

A specific description is given here of a relation between the signal strength P and the groups. FIGS. 6A and 6B show a first and a second allocation example by the channel allocation unit 40 shown in FIG. 4. The horizontal axis indicates the frequency, whereas the vertical axis the signal strength. Both the allocation examples described above show the case where the first subcarrier blocks 200a and the second subcarrier block 200b in the same time slot are allocated to two terminal apparatuses 20. As shown in FIG. 6A, the first subcarrier block 200a is allocated to the first terminal apparatus 20a having the signal strength Px, whereas the second subcarrier block 200b is allocated to the second terminal apparatus 20b having the signal strength Py.

As described above, the signals transmitted from the first terminal apparatus 20a and the second terminal apparatus 20b undergo FFT processing by the receiver 30, and are then separated per subcarrier block, However, in the case where the difference is large between Px and Py, the smaller signal is buried in the larger signal due to a so-called "finite word length" problem, so that the smaller signal may not be demodulated properly. In such a case, it is difficult for the terminal apparatus 20 transmitting the smaller signal to perform communications.

In the light of this, the signal strength of the terminal apparatus 20 to which a single time slot is allocated is limited to a predetermined range, as shown in FIG. 6B. As shown in FIG. 6B, the first subcarrier block 200a is allocated to the first terminal apparatus 20a having the signal strength Px, and the second subcarrier block 200b is allocated to the second terminal apparatus 20b having the signal strength Py. Here, both Px and Py are larger than P0 which is a lower limit of a predetermined range and less than P1 which is an upper limit thereof. In this manner, for the terminal apparatus 20 allocated within a single slot, the allocation is made so that it has the signal strength within a predetermined range. Thereby, the deterioration in the receiving performance due to the fact that a sufficient gain has not been obtained by AGC processing can be avoided, so that the signals in all subcarrier blocks 200 can be demodulated with accuracy.

Here, the upper limit and the lower limit in a predetermined range are set for each group as shown in the power range column 320 of FIG. 5. The groups are defined corresponding to the time slots.

Figure 7:
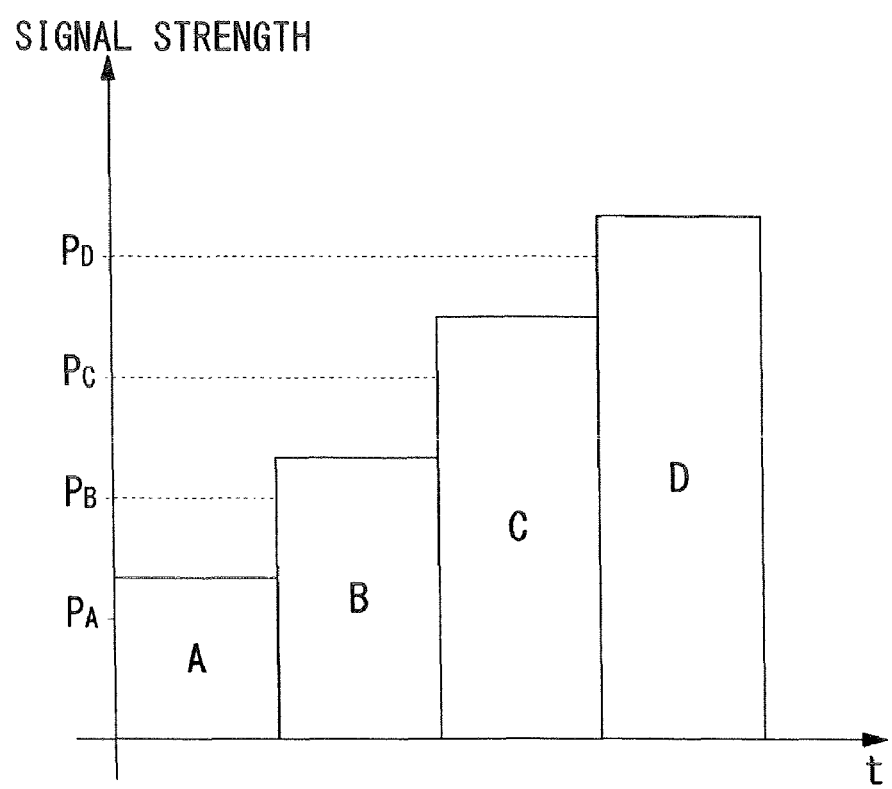
FIG. 7 shows a third allocation example by a channel allocation unit of FIG. 4.

FIG. 7 shows a third allocation example by the channel allocation unit 40 of FIG. 4. The horizontal axis indicates time, whereas the vertical axis indicates the signal strength. The third allocation example illustrates a case where the first group A to the fourth group D are assigned respectively to the first time slot 510 to the fourth time slot 540 according to the relations shown in the group column 310 and the slot column 330 of FIG. 5. As described above, in the first group A allocated to the first time slot 510, the lower limit and the upper limit are $P_A$ and $P_B$, respectively, as allocated ranges of the signal strength of the terminal apparatus 20. Similarly, the second group B to the fourth group D have upper limits and lower limits as shown in the power range column 320 of FIG. 5, respectively, and the second time slot 520 to the fourth time slot 540 are allocated to the terminal apparatuses 20 having the signal strength contained in the respective ranges.

Figure 8:
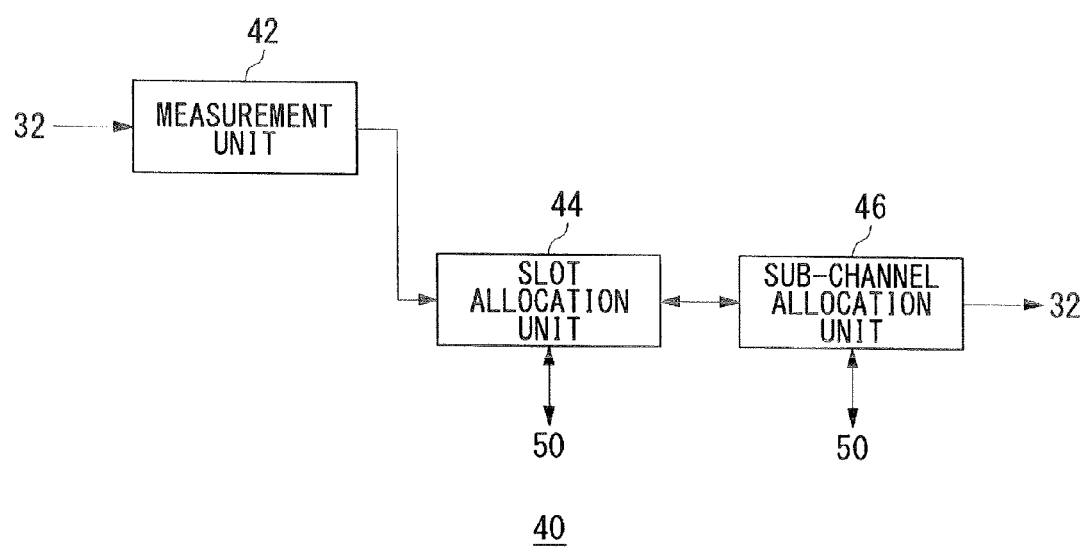
FIG. 8 shows an exemplary structure of a channel allocation unit shown in FIG. 4.

FIG. 8 shows an exemplary structure of the channel allocation unit 40 shown in FIG. 4. The channel allocation unit 40 includes a measurement unit 42, a slot allocation unit 44, and a sub-channel allocation unit 46. The measurement unit 42 measures the signal strength of each terminal apparatus 20 and then conveys the measurement results to the slot allocation unit 44. The slot allocation unit 44 accesses the memory 50 so as to specify a group that contains the informed signal strength. Further, the slot allocation unit 44 selects a time slot corresponding to the specified group. The sub-channel allocation unit 46 selects a subcarrier block to be allocated to a terminal apparatus, from among a plurality of subcarriers contained in the time slot selected by the slot allocation unit 44. If there exists a subcarrier to be allocated to the terminal apparatus 20 and said subcarrier is usable, the sub-channel allocation unit 46 will have information, on the selected time slot and subcarrier block, contained in the information on the allocation and then transmit this information to the terminal apparatus 20. Then the base station apparatus 10 performs communications with the terminal apparatus using the selected time slot and subcarrier block.

If there is no subcarrier to be allocated to the terminal apparatus 20, the sub-channel allocation unit 46 will have the slot allocation unit 44 select another slot. This another slot selected by the slot allocation unit 44 will be a slot where a group whose level is lower than the already selected slot is set. The lower-level group means a group corresponding to a range that contains a smaller signal strength. For example, among the groups shown in the group column 310 of FIG. 5, if the already selected group is C, a group for the slot selected again will be group A or group B. In such a case, the slot allocation unit 44 first selects the corresponding time slot No. 2, about group B having a wave close to the signal strength of group C, among groups whose level is lower than group C. Here, the sub-channel allocation unit 46 checks if any of a plurality of subcarrier blocks contained in the time slot No. 2 corresponding to group B can be allocated to the terminal apparatus 20.

If any of subcarrier blocks in the time slot No. 2 is allocated thereto, the sub-channel allocation unit 46 will have the selected time slot and subcarrier block contained in the information on the allocation and send it to the terminal apparatus 20. Further, the sub-channel allocation unit 46 instructs the terminal apparatus 20 to reduce the transmission power. An amount of the transmission power to be reduced is so determined as to be smaller than the signal strength $P_C$ of the terminal apparatus 20, as shown in the range of the signal strength corresponding to the time slot No. 2, namely, as shown in the power range column 320 of FIG. 5.

If, on the other hand, there is no subcarrier block to be allocated to the terminal apparatus 20 about the time slot No. 2, the sub-channel allocation unit 46 will check if the subcarrier block can be similarly allocated thereto about the time slot No. 1 corresponding to a group whose level is lower than the time slot No. 2. Here, if also there is no subcarrier block to be allocated to the terminal apparatus 20 about the time slot No. 1, the sub-channel allocation unit 46 will transmit to the terminal apparatus 20 a signal indicating that the allocation is to be rejected. In this manner, a time slot for a lower group will be searched until a subcarrier block to be allocated is found, so that the stability of communications can be enhanced.

In terms of hardware, these structures described as above can be realized by a CPU and a memory of an arbitrary computer and other LSIs. In terms of software, it can be realized by memory-loaded programs which have communication functions and the like, but drawn and described herein are function blocks that are realized in cooperation with those. Hence, it is understood by those skilled in the art that these function blocks can be realized in a variety of forms such as by hardware only, software only or the combination thereof.

Figure 9A:
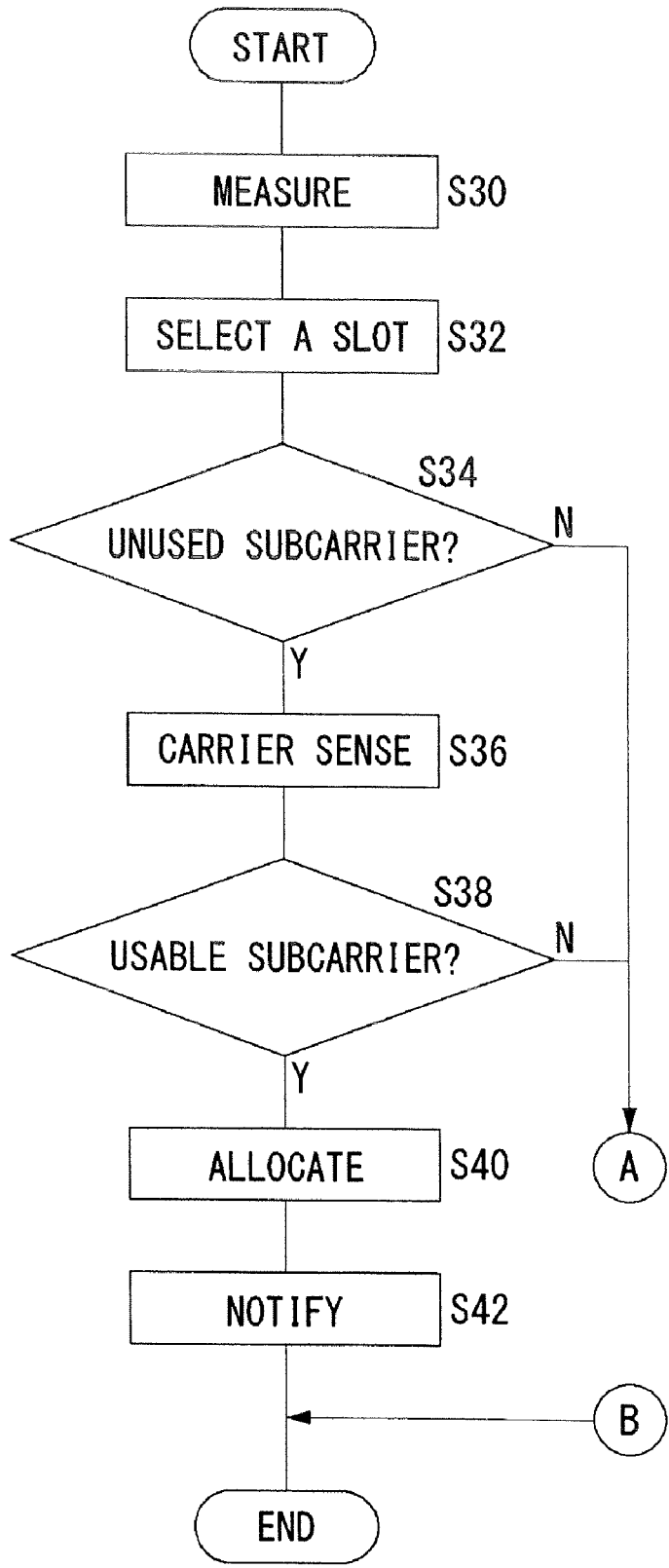
FIG. 9A is a flowchart showing an operation example of a channel allocation unit shown in FIG. 4.
Figure 9B:
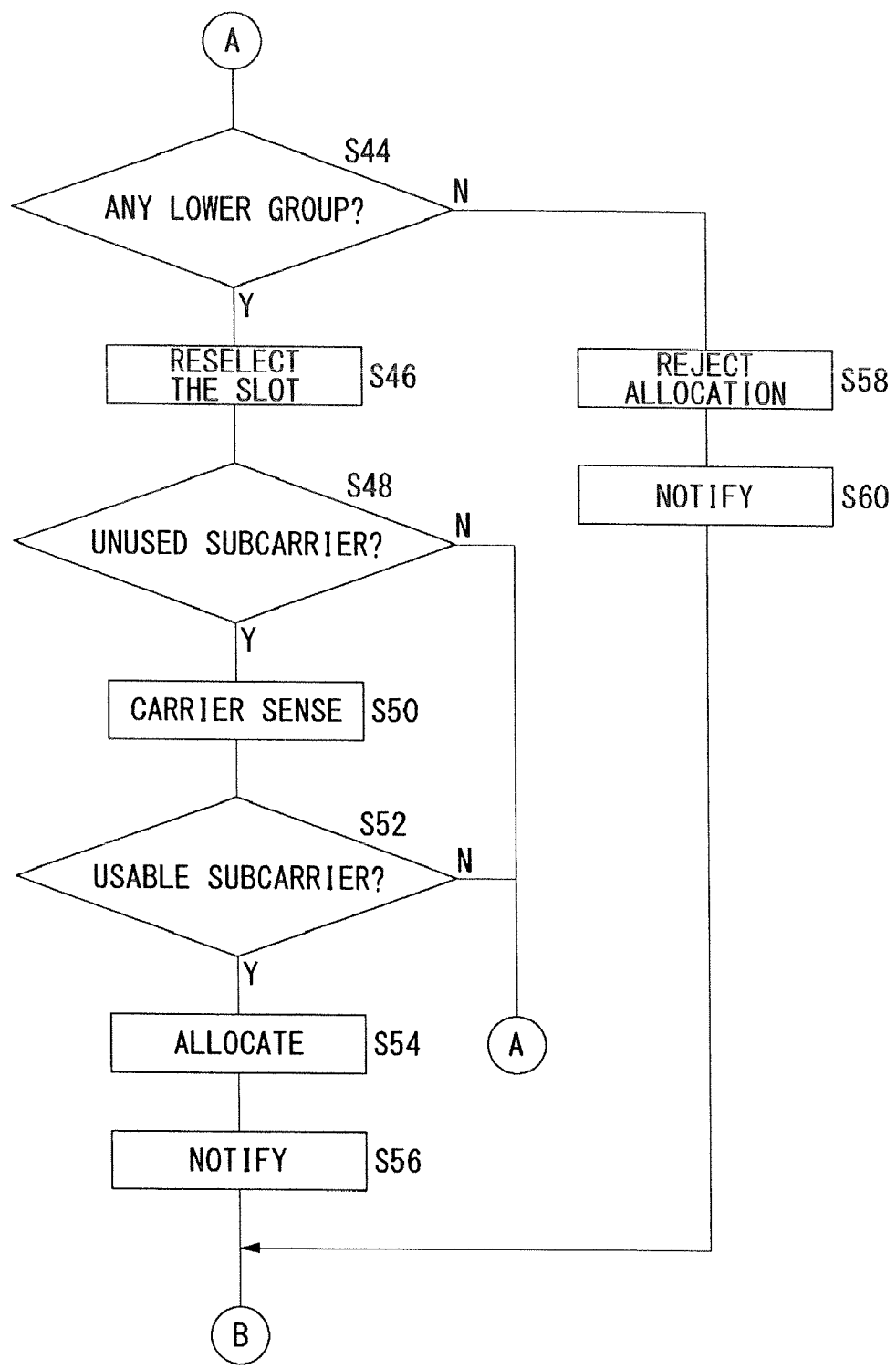
FIG. 9B is a flowchart showing an operation example of a channel allocation unit shown in FIG. 4.

Next, an operation will be described. FIGS. 9A and 9B are flowcharts each showing an operation example of the channel allocation unit 40 shown in FIG. 4. This processing may be started by the base station apparatus 10 upon receipt of a signal on an allocation request from the terminal apparatus 20. First, the channel allocation unit 40 measures the signal transmitted from the terminal apparatus 20 (S30). Then the channel allocation unit 40 accesses the memory 50 and selects a time slot corresponding to the acquired signal strength (S32).

Here, if there is an unused subcarrier block (Y of S34) in the selected time slot, carrier sense is performed to check if said subcarrier block is usable or not (S36). If, as a result of the carrier sense, it is an usable subcarrier block (Y of S38), the channel allocation unit 40 will perform allocation processing (S40). Further, the channel allocation unit 40 conveys information on the allocation to the terminal apparatus 20 (S42) and completes the processing.

If, on the other hand, there is no unused subcarrier blocks in the selected time slot (N of S34) or said subcarrier block is not usable (N of S38), the process will shift to the processing of S44 and the subsequent steps shown in FIG. 9B. The channel allocation unit 40 accesses the memory 50 and checks if there is any group whose level is lower than the group for the selected time slot. If there is no such a group (N of S44), the allocation will be rejected (S58) and a signal indicating the rejection of allocation will be conveyed to the terminal apparatus (S60). If, on the other hand, there is the group whose level is lower than that for the selected time slot (Y of S44), a time slot for the lower group will be selected (S46).

Here, if there is an unused subcarrier block in the selected time slot (Y of S48), carrier sense is performed to check if said subcarrier block is usable or not (S50). If, as a result of the carrier sense, it is an usable subcarrier block (Y of S52), the channel allocation unit 40 will perform allocation processing (S54). Further, the channel allocation unit 40 conveys information on the allocation to the terminal apparatus 20 (S56) and completes the processing. If, on the other hand, there is no unused subcarrier blocks in the selected time slot (N of S48) or said subcarrier block is not usable (N of S52), the process will return to the processing of S44.

According to the present embodiment, a time slot to be allocated is selected in accordance with a specified group depending on the range of the signal strength. Thus the signals from a plurality of terminal apparatuses to which the same time slot is allocated are mutually less influenced by one another, so that the degradation in receiving performance can be reduced. If all of a plurality of subcarriers contained in the time slot selected by a slot selector have already been allocated to the other terminal apparatuses, the reduction of transmission power will be specified to the terminal apparatus and then a time slot corresponding to a group having the strength according to the reduced power will be selected. This can easily establish communications without being accompanied by the degradation in receiving performance.

Next, a modification to the embodiments of the present invention will be shown. A general outline thereof is first described. This modification relates to a communication system, similarly to the above-described embodiments. The communication system according to this modification has the same structure as the exemplary structure of FIG. 1. The base station apparatus 10 has the same structure as with the exemplary structure of FIG. 4. A difference of this modification from the embodiments of the present invention lies in a feature that the channel allocation unit 40 shown in FIG. 8 further includes a control channel allocation unit. In this modification, the receiving performance in the base station apparatus 10 can be further enhanced by setting a relation between the group column 310 and the slot column 330 of FIG. 5. Note that parts common to the above-described embodiments are given the identical numerals and the description thereof is simplified here.

Figure 10:
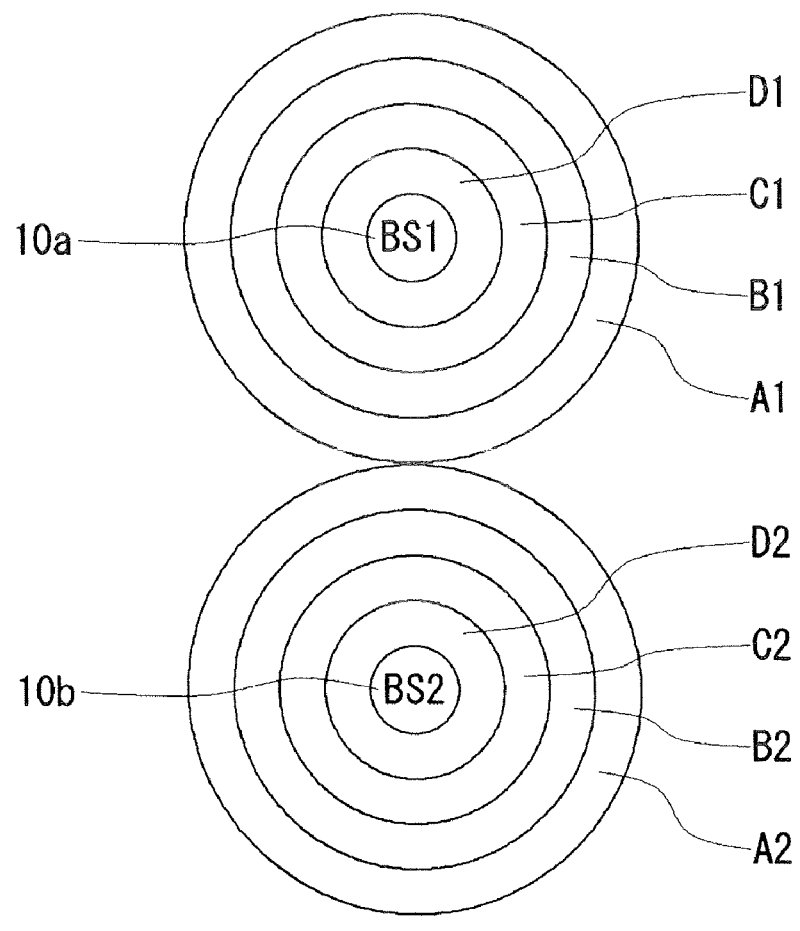
FIG. 10 schematically shows a communication area of a communication system according to a modification of an embodiment of the present invention.

FIG. 10 schematically shows a communication area of a communication system according to a modification of the embodiments of the present invention. The communication system 400 includes a first base station apparatus 10*a* and a second base station apparatus 10*b*. Assume that the first base station apparatus 10*a* and the second base station apparatus 10*b* perform communication with the terminal apparatus 20 using the same frequency band 210. A description will be given hereinbelow of uplink communications only and the description of the downlink communications is omitted.

The first base station apparatus 10*a* is surrounded by a first area A1 to a fourth area D1 as communicatable areas, and performs communications with terminal apparatuses 20 located in their respective areas. The first area A1 is located farthest from the first base station apparatus 10*a*, and the distance from the base station apparatus 10*a* is getting smaller in the order of the second area B1, the third area C1 and the fourth area D1.

In general, the signal transmitted from the terminal apparatus 20 attenuates according to the distance therefrom. Thus, the farther the distance between a base station apparatus 10 and a terminal apparatus 20 is, the smaller the received power in the base station apparatus is. In FIG. 10, the received power from the terminal apparatus 20 located in the first area A1 is the smallest, and the received power of the signal from the terminal apparatus 20 in each location becomes larger in the order of the second area B1, the third area C1 and the fourth area D1. Similarly, the second base station apparatus 10*b* performs communications with the terminal apparatuses 20 located in their respective areas of a fifth area A2 to an eighth area D2. In the second base station apparatus 10*b*, the received power from the terminal apparatus 20 located in the fifth area A2 is the smallest, and the received power of the signal from the terminal apparatus 20 located in each location becomes larger in the order of the sixth area B2, the seventh area C2 and the eighth area D2.

As shown in FIG. 10, the first area A1 and the fifth area A2 are adjacent to each other. Accordingly, if the terminal apparatuses 20 located in the respective areas use the same time slot, one signal will be buried in the other signal, as in the above-described embodiment, because of the difference in the magnitude of the received power and therefore there will be cases where the proper demodulation cannot be done. For this reason, according to this modification, a time slot allocated to an area outside the base station apparatus 10 is so set as to be different from a time slot allocated to an area outside the other base station apparatus 10.

Figure 11:
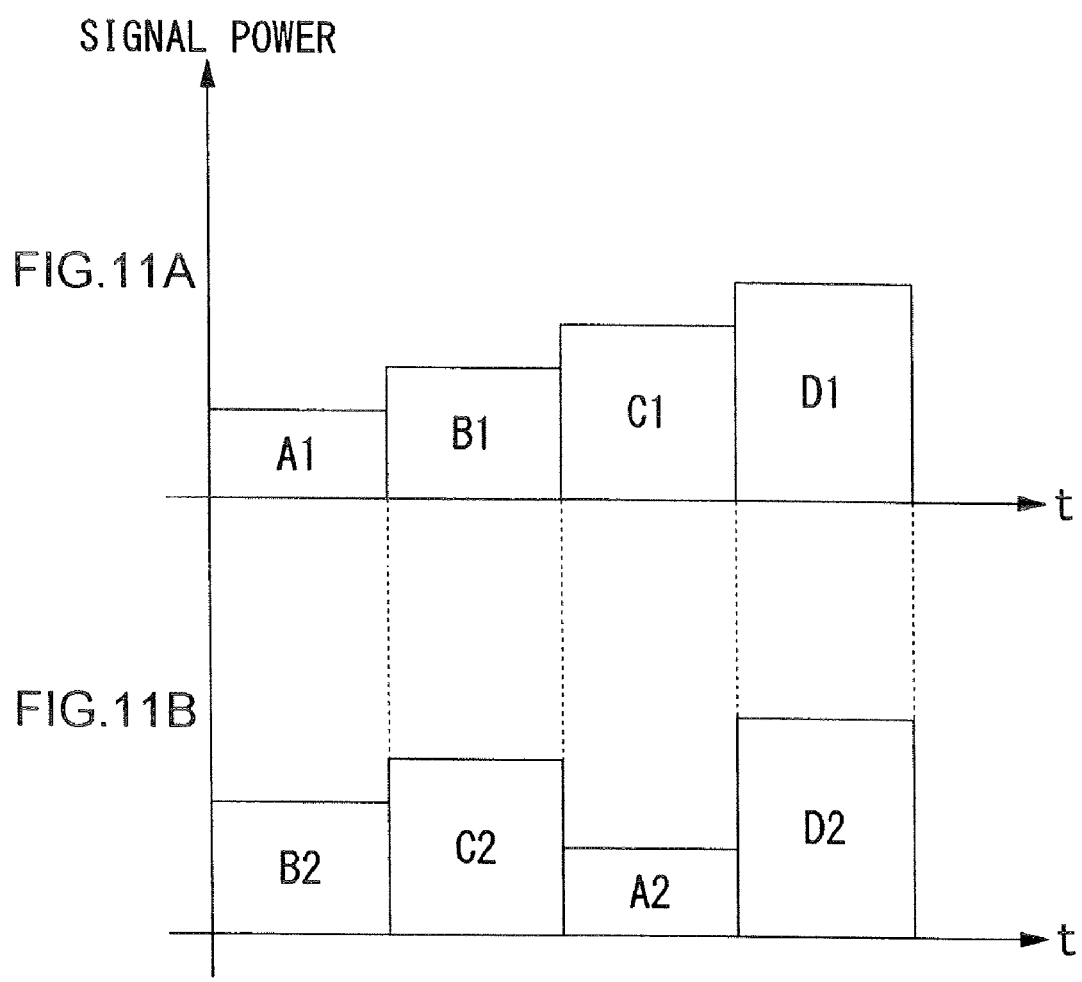
FIGS. 11A and 11B schematically show examples of allocation of time slots in a communication system of FIG. 10.

In other words, a time slot allocated to a terminal apparatus 20 belonging to a group whose received power is low in the base station apparatus 10 (this time slot will be hereinafter referred to as "specified time slot") is so set as to be different from the specified time slot in the other base station apparatuses 10. FIGS. 11A and 11B schematically show examples of allocation of time slots in the communication system 400 of FIG. 10. FIG. 11A shows an example of allocation in the first base station apparatus 10*a*. FIG. 11B shows an example of allocation in the second base station apparatus 10*b*. As shown in FIGS. 11A and 11B, the first area A1 and the fifth area A2 are allocated to different time slots, respectively. By making the allocation in this manner, the signals from the base station apparatuses 10 can be demodulated accurately in the both base station apparatuses 10.

In this modification, a time slot allocated to a control channel is set, as the specified time slot, in order to set a relation between the groups and time slots as in the above-described manner. Since in general the control channel containing the information to be conveyed needs to be conveyed to terminal apparatuses located in all areas, the control channel is allocated to a time slot having a smaller interference and is conveyed thereto. The time slot having a smaller interference is detected using the following procedure. First, the measurement unit 42 measures the strength of control channels informed from the other base station apparatuses 10 for each time slot, and calculates the number of them exceeding a threshold value for each time slot. The control channel allocation unit allocates the control channel for the radio apparatus to a time slot where the number thereof is relatively small as a result of the calculation by the measurement unit 42.

Satisfactory communications are desired in not only the control channel but also a channel on data. However, if the base station apparatus 10 performs communications with a terminal apparatus 20 located in an area far from the base station apparatus 10, an adverse effect on the demodulation performance will result due to distance. Here, as described above, the control channel is allocated to a time slot having a smaller interference and is conveyed to the terminal apparatuses 20 present in all areas. Thus, it is only necessary that the same time slot as one to which the control channel has been allocated is allocated to a group to which the terminal apparatus 20 located in the first area A1 in the first base station apparatus 10*a* belongs. The "same time slot" is a time slot which is a frame different from the frame that the time slot belongs to and whose relative timing within the frame corresponds to the time slot allocated to the control channel.

More specifically, as shown in the power range column 320 of FIG. 5, since the group corresponding to the lowest range of the signal strength in the power range column 320 of FIG. 5 is group A, the corresponding slot column 330 is set as the specified time slot. For example, if the time slot is No. 2, the slot column 330 corresponding to the group A is "2" and set accordingly. The setting can be made in a manner that the control channel allocation unit sets it to the memory 50. With such allocation, the receiving performance can be enhanced.

Figure 12:
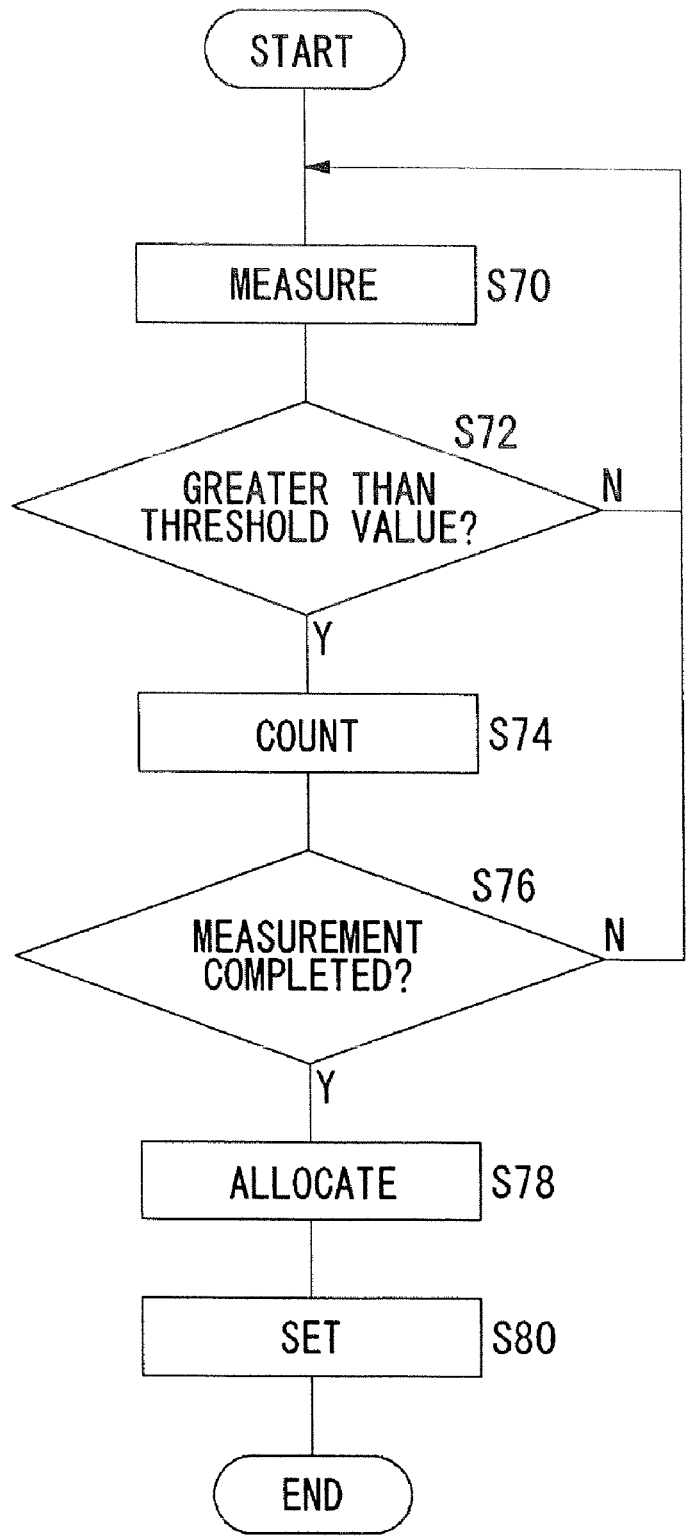
FIG. 12 is a flowchart showing an operation example concerning a base station apparatus shown in FIG. 10.

FIG. 12 is a flowchart showing an operation example concerning a base station apparatus shown in FIG. 10. First, the base station apparatus 10 measures the received power of the control channel conveyed to the other base station apparatus 10 (S70). Here, if the measured received power is larger than a predetermined threshold value (Y of S72), a count is made (S74). The count is made for each time slot to which the measured control channel has been allocated. If, on the other hand, the measured received power is smaller than the predetermined threshold value (N of S72), a return is made to the processing of S70. If the measurement has not been completed (N of S76), a return is made to the processing of S70.

If the measurement has been completed (Y of S76), a time slot where the number of counts is minimum is selected, and the selected time slot is allocated to the control channel (S78). Further, the allocation table 300 shown in FIG. 5 is set so that the group corresponding to a range that contains the lowest received power is allocated to the time slot to which the control channel has been allocated (S80).

According to this modification, the control channel is allocated and the time slot equivalent to the time slot whose strength of the signal from the other radio apparatuses is low is allocated to the terminal apparatus. Hence, the degradation in receiving performance can be reduced. The specified time slot in said radio apparatus is set in a manner that the specified time is made to differ from the specified time slot set in the other radio apparatuses. Thus, the terminal apparatuses located in the neighborhood of the cell edges in their respective radio apparatuses can allocate different time slots and therefore the deterioration in the receiving performance due to the mutual interference can be reduced. The time slot allocated to a group containing a relatively low strength in said radio apparatus is so set as to be different from the time slots allocated to groups of smaller strength to which the control channel has been allocated in the other radio apparatuses. Thereby, the terminal apparatuses located in the neighborhood of the cell edges in their respective radio apparatuses can allocate different time slots and therefore the deterioration in the receiving performance due to the mutual interference can be reduced.

The present invention has been described based on the preferred embodiments and some modifications. These embodiments and modifications are merely exemplary, and it is understood by those skilled in the art that various other modifications to the combination of each component and each process thereof are still possible and that such modifications are also within the scope of the present invention.

In the embodiments and the modification of the present invention, a description has been given of a case where OFDMA and TDMA are applied in the communication system 100. However, this should not be considered as limiting and it is only necessary that at least TDMA is applied in the communication system 100. For example, TDMA and CDMA (Code Division Multiple Access) may be used, and TDMA and SDMA (Space Division Multiple Access) may also be used. A description has been given of a case where the present embodiment is applied to the uplink transmission. However, it is not limited thereto and the modifications is applicable in the downlink transmission. In such a case, the base station apparatus 10 may acquire the signal strength of the terminal apparatus 20 in consideration of the amount of transmission power control in the downlink transmission and determine which range of the power range column 320 shown in FIG. 5 the thus acquired signal strength belongs to.

A description has been given that in the modification the base station apparatus 10 sets the time slots allocated to the terminal apparatuses located in areas adjacent to each other in a manner that the time slots allocated thereto are different from each other in the light of relationship with the other base station apparatus 10 whose communicatable area is adjacent thereto. However, the modification is not limited thereto, and the base station apparatus 10 may set the time slots in a manner that the time slots allocated to the terminal apparatuses 20 located in each other's cell edges are different from each another in the light of relationship with the other base station apparatus 10 which is not located adjacent thereto. The base station apparatus 10 comes under the influence of a signal from a terminal apparatus 20 located in an outer area among the communicatable areas of the other base station apparatus which is not located adjacent thereto. Thus, by setting the time slots as to be different from each other, the receiving performance can be enhanced all the more.

The present invention may be expressed by the following embodiments. A receiving apparatus according to one embodiment of the present invention allocates a terminal apparatus to a time slot to which a plurality of subcarriers are assigned. This radio apparatus comprises: an acquiring unit which acquires a strength of signals between the radio apparatus and the terminal apparatus; a group specifying unit which specifies a group, containing the strength acquired by the acquiring unit, among a plurality of groups wherein the plurality of groups are predefined in a manner such that ranges of strength values for the plurality of groups differ respectively from the strength acquired by the acquiring unit; a slot selector which selects a time slot corresponding to the group specified by the group specifying unit wherein time slots to be allocated are predefined respectively for the plurality of groups predefined by the group specifying unit; a subcarrier selector which selects a subcarrier to be assigned to the terminal apparatus, from among a plurality of subcarriers contained in the time slot selected by the slot selector; and a communication executing unit which performs communications between the radio apparatus and the terminal apparatus by using the time slot selected by the slot selector and the subcarrier selected by the subcarrier selector.

Here, the "time slot to which a plurality of subcarriers are assigned" includes a time slot which is frequency-division multiplexed and a time slot which a plurality of users can use simultaneously. The "strength of signals" includes a transmission power and a received power of the signal and so forth and it also includes a power-to-noise ratio, a power-to-interference ratio or the like. "Acquires the strength of signals" includes measuring the strength of signals received and also includes acquiring information on the received power measured in the terminal apparatus, information on the transmission power of the terminal apparatus or the like.

According to this embodiment, a time slot to be allocated is selected in accordance with a specified group depending on the range of the signal strength. Thus a plurality of terminals allocated to the same time slot share the similar signal strength and the influence of one terminal to another in the receiving performance is minimum, so that the degradation in receiving performance can be reduced.

A radio apparatus may further comprise a specifying unit which specifies a reduction of transmission power to the terminal apparatus when all of the plurality of subcarriers contained in the time slot selected by the slot selector are assigned to other terminal apparatuses. As a time slot allocated anew to the terminal apparatus, the slot selector may select a time slot corresponding to a group containing a strength that corresponds to the reduced power.

According to this embodiment, if all of a plurality of subcarriers contained in the time slot selected by the slot selector have already been allocated to the other terminal apparatuses, the reduction of transmission power will be specified to the terminal apparatus and then a time slot corresponding to a group having the strength according to the reduced power will be selected. This can easily establish communications without being accompanied by the degradation in receiving performance.

A radio apparatus may further comprise: a detector which measures a strength of a control channel broadcast to other radio apparatuses about each time slot and which detects, for the each time slot, the number of strengths that have exceeded a predetermined threshold value; and a control channel allocation unit which allocates the control channel for the radio apparatus, to a time slot whose number thereof detected by the detector is relatively small. A plurality of time slots, from which a selection is to be made by the slot selector, belongs to a frame and the frame is repeatedly arranged. The slot selector may define a relation between groups and time slots in a manner such that a group containing a relatively low strength among the plurality of groups is allocated to a time slot corresponding to a time slot allocated to the control channel and a time slot corresponding to a relative timing in the frame, among frames that differ from a frame to which the time slot allocated to the control channel by the control channel allocation unit belongs.

Here, "a plurality of time slots belongs to a frame and the frame is repeatedly arranged" includes that each frame is constituted by a plurality of time slots and that a plurality of time slots are assigned to any of frames. "A time slot whose relative timing within the frame corresponds to the time slot to which the control channel has been allocated" includes a time slot where the time interval from the beginning of a frame until the beginning of a predetermined time slot arranged within the frame are identical to each other.

According to this embodiment, the control channel is allocated and the time slot equivalent to the time slot whose strength of the signal from the other radio apparatuses is low is allocated to the terminal apparatus. Hence, the degradation in receiving performance can be reduced.

The slot selector may define a relation between groups and time slots in a manner such that a specific time slot corresponding to a group containing a relatively low strength among the plurality of groups does not overlap with a specific time slot set by another radio apparatus. In this case, the specific time slot in the wireless apparatus is so set as not to overlap with the specific time slots set in the other radio apparatuses. Therefore the terminal apparatuses located in the neighborhood of the cell edges in their respective radio apparatuses can allocate non-overlapping time slots, respectively. Therefore the deterioration in the receiving performance due to the mutual interference can be reduced.

The slot selector may define a time slot corresponding to a group that contains a relatively low strength among the plurality of groups in such a manner as not to overlap with a time slot allocated to a control channel in another radio apparatus. In this case, the time slot allocated to a group containing a relatively low strength in the radio apparatus is so set as not to overlap with the time slots allocated to groups of smaller strength to which the control channel has been allocated in the other radio apparatuses. Thereby, the terminal apparatuses located in the neighborhood of the cell edges in their respective radio apparatuses can allocate non-overlapping time slots, respectively, and therefore the deterioration in the receiving performance due to the mutual interference can be reduced.

Another embodiment of the present invention relates to a communication method for allocating a terminal apparatus to a time slot to which a plurality of subcarriers are assigned and communicating with the terminal. This method comprises: acquiring a strength of signals between a radio apparatus and the terminal apparatus; specifying a group, containing the strength acquired by the acquiring, among a plurality of groups wherein the plurality of groups are predefined in a manner such that ranges of strength values for the plurality of groups differ respectively from the strength acquired by the acquiring; selecting a time slot corresponding to the group specified by the specifying wherein time slots to be allocated are predefined respectively for the plurality of groups predefined by the specifying; selecting a subcarrier to be assigned to the terminal apparatus, from among a plurality of subcarriers contained in the time slot selected by the selecting a time slot; and performing communications with the terminal apparatus by using the time slot selected by the selecting a time slot and the subcarrier selected by the selecting a subcarrier.

Still another embodiment of the present invention relates to a program, executable by a computer, for allocating a terminal apparatus to a time slot to which a plurality of subcarriers are assigned and communicating with the terminal. This program includes the functions of: acquiring a strength of signals between a radio apparatus and the terminal apparatus; specifying a group, containing the strength acquired by the acquiring, among a plurality of groups wherein the plurality of groups are predefined in a manner such that ranges of strength values for the plurality of groups differ respectively from the strength acquired by the acquiring; selecting a time slot corresponding to the group specified by the specifying wherein time slots to be allocated are predefined respectively for the plurality of groups predefined by the specifying; selecting a subcarrier to be assigned to the terminal apparatus, from among a plurality of subcarriers contained in the time slot selected by the selecting a time slot; and performing communications with the terminal apparatus by using the time slot selected by the selecting a time slot and the subcarrier selected by the selecting a subcarrier.

This program may further comprise the function of specifying a reduction of transmission power to the terminal apparatus when all of the plurality of subcarriers contained in the time slot selected by the selecting a time slot are assigned to other terminal apparatuses. As a time slot allocated anew to the terminal apparatus, the selecting a time slot may select a time slot corresponding to a group containing a strength that corresponds to the reduced power.

This program may further comprise the function of: measuring a strength of a control channel broadcast to other radio apparatuses about each time slot and detecting, for the each time slot, the number of strengths that have exceeded a predetermined threshold value; and allocating the control channel for the radio apparatus, to a time slot whose number thereof detected by the detecting is relatively small. A plurality of time slots, from which a selection is to be made in the selecting a time slot, belongs to a frame and the frame is repeatedly arranged. The selecting a time slot may define a relation between groups and time slots in a manner such that a group containing a relatively low strength among the plurality of groups is allocated to a time slot corresponding to a time slot allocated to the control channel and a time slot corresponding to a relative timing in the frame, among frames that differ from a frame to which the time slot allocated to the control channel by the allocating belongs.

The selecting a time slot may define a relation between groups and time slots in a manner such that a specific time slot corresponding to a group containing a relatively low strength among the plurality of groups differs from a specific time slot set by another radio apparatus.

The selecting a time slot may define a time slot corresponding to a group that contains a relatively low strength among the plurality of groups in such a manner as to differ from a time slot allocated to a control channel in another radio apparatus.

While the preferred embodiments of the present invention have been described using specific terms, such description is for illustrative purposes only, and it is to be understood that changes and variations may be further made without departing from the spirit or scope of the appended claims.

What is claimed is:

1. A radio apparatus for allocating a time slot to which a plurality of subcarriers are assigned, to a terminal apparatus, the radio apparatus comprising:
   an acquiring unit which acquires a strength of signals between said radio apparatus and the terminal apparatus;
   a group specifying unit which specifies a group, containing the strength acquired by said acquiring unit, among a plurality of groups wherein the plurality of groups are predefined in a manner such that ranges of strength values for the plurality of groups differ respectively from the strength acquired by said acquiring unit;
   a slot selector which selects a time slot corresponding to the group specified by said group specifying unit wherein time slots to be allocated are predefined respectively for the plurality of groups predefined by said group specifying unit;
   a subcarrier selector which selects a subcarrier to be assigned to the terminal apparatus, from among a plurality of subcarriers contained in the time slot selected by said slot selector;
   a communication executing unit which performs communications between said radio apparatus and the terminal apparatus by using the time slot selected by said slot selector and the subcarrier selected by said subcarrier selector; and
   a specifying unit which specifies a reduction of transmission power to the terminal apparatus when all of the plurality of subcarriers contained in the time slot selected by said slot selector are assigned to other terminal apparatuses,
   wherein as a time slot allocated anew to the terminal apparatus said slot selector selects a time slot corresponding to a group containing a strength that corresponds to the reduced power.

2. A radio apparatus according to claim 1, further comprising:
   a detector which measures a strength of a control channel broadcast to other radio apparatuses about each time slot and which detects, for the each time slot, the number of strengths that have exceeded a predetermined threshold value; and
   a control channel allocation unit which allocates the control channel for said radio apparatus, to a time slot whose number thereof detected by said detector is relatively small,
   wherein a plurality of time slots, from which a selection is to be made by said slot selector, belongs to a frame and the frame is repeatedly arranged, and
   wherein said slot selector defines a relation between groups and time slots in a manner such that a group containing a relatively low strength among the plurality of groups is allocated to a time slot corresponding to a time slot allocated to the control channel and a time slot corresponding to a relative timing in the frame, among frames that differ from a frame to which the time slot allocated to the control channel by the control channel allocation unit belongs.

3. A radio apparatus according to claim 1, wherein said slot selector defines a relation between groups and time slots in a manner such that a specific time slot corresponding to a group containing a relatively low strength among the plurality of groups does not overlap with a specific time slot set by another radio apparatus.

4. A radio apparatus according to claim 1, wherein said slot selector defines a time slot corresponding to a group that contains a relatively low strength among the plurality of groups in such a manner as not to overlap with a time slot allocated to a control channel in another radio apparatus.

5. A communication method for allocating a terminal apparatus to a time slot to which a plurality of subcarriers are assigned and communicating with the terminal, the method comprising:
   acquiring a strength of signals between a radio apparatus and the terminal apparatus;
   specifying a group, containing the strength acquired by said acquiring, among a plurality of groups wherein the plurality of groups are predefined in a manner such that ranges of strength values for the plurality of groups differ respectively from the strength acquired by said acquiring;
   selecting a time slot corresponding to the group specified by said specifying wherein time slots to be allocated are predefined respectively for the plurality of groups predefined by said specifying;
   selecting a subcarrier to be assigned to the terminal apparatus, from among a plurality of subcarriers contained in the time slot selected by said selecting a time slot;
   performing communications with the terminal apparatus by using the time slot selected by said selecting a time slot and the subcarrier selected by said selecting a subcarrier; and
   specifying a reduction of transmission power to the terminal apparatus when all of the plurality of subcarriers contained in the time slot selected by said slot selector are assigned to other terminal apparatuses,
   wherein as a time slot allocated anew to the terminal apparatus said slot selector selects a time slot corresponding to a group containing a strength that corresponds to the reduced power.

6. A non-transitory tangible computer readable medium having a program, executable by a computer, for allocating a terminal apparatus to a time slot to which a plurality of subcarriers are assigned and communicating with the terminal, the program, when executed, causing the computer to perform the functions of:
   acquiring a strength of signals between a radio apparatus and the terminal apparatus; specifying a group, containing the strength acquired by said acquiring, among a plurality of groups wherein the plurality of groups are predefined in a manner such that ranges of strength values for the plurality of groups differ respectively from the strength acquired by said acquiring;
   selecting a time slot corresponding to the group specified by said specifying wherein time slots to be allocated are predefined respectively for the plurality of groups predefined by said specifying;
   selecting a subcarrier to be assigned to the terminal apparatus, from among a plurality of subcarriers contained in the time slot selected by said selecting a time slot;
   performing communications with the terminal apparatus by using the time slot selected by said selecting a time slot and the subcarrier selected by said selecting a subcarrier; and
   specifying a reduction of transmission power to the terminal apparatus when all of the plurality of subcarriers contained in the time slot selected by said slot selector are assigned to other terminal apparatuses,
   wherein as a time slot allocated anew to the terminal apparatus said slot selector selects a time slot corresponding to a group containing a strength that corresponds to the reduced power.

* * * * *